United States Patent Office 2,953,554
Patented Sept. 20, 1960

2,953,554

METHOD OF REMOVING HEAVY METAL CATALYST FROM OLEFINIC POLYMERS BY TREATMENT WITH AN AQUEOUS SOLUTION OF A COMPLEXING AGENT

Floyd F. Miller, Wadsworth, and David S. Conner, Avon Lake, Ohio, assignors to Goodrich-Gulf Chemicals, Inc., Cleveland, Ohio, a corporation of Delaware No Drawing. Filed Aug. 7, 1956, Ser. No. 602,490

5 Claims. (Cl. 260—94.3)

The present invention relates to the treatment of solutions of solvated hydrocarbon polymers in hydrocarbon solvents. More particularly the invention relates to the treatment of reaction mixtures containing (1) dissolved or highly solvated olefinic hydrocarbon polymers and (2) residues of organometallic catalysts containing "heavy metals" and acid-generating groups.

Monomeric hydrocarbons, particularly the 1-olefinic hydrocarbons, polymerize in hydrocarbon solvent or diluent media in the presence of certain "heavy metal organometallic catalysts" to produce novel polymers having great uniformity of structure and highly useful properties. Isoprene, for example, can be polymerized in this way to produce highly desirable all cis-1,4 or all trans-1,4 polyisoprenes, the product in either case usually being a viscous solution containing active catalyst residue. Similarly, ethylene and propylene polymerize by this method to produce homopolymers which are very high in molecular weight, have pronounced crystallinity and which are obtained as slurries of highly insoluble, solid polymer, which is nevertheless surface-solvated to a greater or lesser degree. Sometimes such polymerizations result in two polymeric phases, one being insoluble and the other completely soluble. Some of the catalysts used in this type of polymerization are soluble while others are only partly soluble and contain a precipitate which often is very dark or highly colored. All such catalysts are highly sensitive to oxygen.

In working up such reaction mixtures it is first necessary to deactivate the catalyst and convert it to an oxygen-insensitive, and preferably completely soluble form, before exposing the material to the atmosphere. Alcohols, certain amines, certain carboxylic acids, and deoxygenated water all have the ability to "kill" or "shortstop" these catalysts and convert them to oxygen-insensitive, soluble reaction products. However, with all of these shortstopping agents except the amines acidic by-products usually are formed which make the polymer strongly acidic and hence have a strongly corrosive action on steel and stainless steel equipment. Moreover, alcohol-catalyst reaction products have a strong tendency to degrade soluble or solvated polymer; residues of the amines, per se, have deleterious effects on sulfur vulcanization and some of the amines react with the catalyst forming reaction products which even more strongly interfere with vulcanization and adversely affect properties of vulcanizates; and, of course, water and common acids hydrolyze these catalysts and their residues forming acidic by-products which usually cannot be neutralized without forming insoluble heavy metal hydroxides and/or oxides.

Furthermore, in any of the aforementioned methods which leave catalyst residues in the solvent, whether inactivated or not, difficulties are encountered during solvent recovery operations. For example, when a polymer solution is treated with alcohol to inactivate the catalyst, the solvent recovered therefrom must usually be washed with water to extract the alcohol. When this is done messy sludges are formed at the solvent-water interface which interfere with the extraction operation. The sludge appears to be derived from the dissolved metal content of the solvent, its composition probably being hydrated or hydrolyzed forms of the metal. Substantially metal-free solvent-alcohol mixtures do not suffer these disadvantages.

In accordance with this invention, however, it has been found that certain metal complexing agents, which form water-soluble complexes or chelates with the heavy metals, react with the metal content of the catalyst and its residues forming complexes which are stable to oxygen, acid and alkali. The method of this invention, therefore, comprises the step-wise treatment of catalyst-containing, hydrocarbon solvent solutions, first with an aqueous solution of such a complexing agent and then with sufficient alkali to produce a pH of at least 5, thereby to substantially neutralize the acidic substances liberated in the catalyst-deactivation step. If the solvent solution contains active catalyst, the latter is deactivated and converted to inactive oxygen-insensitive forms. If the catalyst is already in an inactivated but solvent-soluble state, the metal content thereof is abstracted from the solvent phase and quantitatively transferred to the aqueous phase. Acidic substances liberated either by a prior catalyst inactivation step, or by the complexing reaction itself, are neutralized and a metal-free solvent solution obtained which does not corrode equipment and which does not contain acids or metal residues deleterious to subsequent operations. Where the solvent solution contains solvated polymer the latter is demetallated, neutralized and rendered quite free of electrolytic materials so as to be recoverable in a stable, non-corrosive form.

The method of this invention is especially suited to the treatment of solvent solutions containing, in addition to the catalyst and/or its residues, a more or less highly solvated (or dissolved) hydrocarbon polymer. Such solutions, described above, are difficult to process so as to obtain a metal-free, neutral polymer because the polymer tenaciously retains the organometallic type catalysts and interferes with catalyst extraction procedures based on organic extractants. The method of this invention is especially adaptable to hydrocarbon solvent solutions containing dissolved polymers such as polypentene, polybutadiene, polyisoprene, 1-monoolefin/isoprene copolymers, and others. Following the two-step catalyst extraction procedure the polymer solution can then be treated to precipitate the polymer and the recovered solvent treated by simple distillation and/or extraction to recover a polymerization grade solvent for recycle to the polymerization step.

The hydrocarbon solution treated by the method of this invention may contain any aliphatic, aromatic or cycloaliphatic solvent including ethylene, propylene, propane, butane, isobutene, diisobutylene, n-pentane, n-hexane, n-heptane, n-octane, "Deobase" kerosene, diesel oil, Fischer-Tropsch hydrocarbons, benzene, toluene, xylene, cyclohexane, cycloheptane, and many others. The aromatic hydrocarbons, such as benzene, are preferred.

The reaction mixtures susceptible to treatment by the method of this invention may contain any hydrocarbon polymer. For example, polyethylene; high molecular weight, crystalline polypropylene; and high molecular weight, crystalline polystyrene are substantially insoluble in most common hydrocarbon solvents but, even so, the surface of such polymers is solvated to a greater or lesser degree and have a tendency to hold catalyst residues. Higher monoolefins such as 1-butene, 1-pentene, 1-hexene, 1-octene and the like, on the other hand, polymerize in hydrocarbon solvents with organometallic catalysts to produce more or less soluble homopolymers. The latter monomers also copolymerize with isoprene to produce hydrocarbon-soluble copolymers. The dienes such as isoprene and butadiene polymerize in hydrocarbon solvents to form more or less completely soluble homopolymers and copolymers with other mono- and diolefins such as styrene and the like.

Because the method of this invention is suitable for producing neutral polymers substantially free of polyvalent metal or heavy metal compounds, the preferred raction mixtures contain an at least partially solvated polymer of a 1-olefinic hydrocarbon, that is, a polymer of a polymerizable hydrocarbon monomer containing at least one polymerizable 1-olefinic $CH_2=C<$ group per molecule and which does not polymerize to form a highly insoluble cross-linked polymer. Thus there may be utilized reaction mixtures containing (1) a hydrocarbon solvent, (2) a polymer of the type described and (3) a polyvalent or heavy metal compound. Illustrative polymers are those of the 1-monoolefinic hydrocarbons enumerated above and others; polymers of open-chain, aliphatic conjugated dienes such as butadiene, isoprene, piperylene, 2,3-dimethyl-butadiene-1,3, 2-ethyl-pentadiene-1,3, hexadiene-2,4, 2-neopentyl-butadiene-1,3, myrcene, alloocimene, or the like; the conjugated alicyclic polyolefinic hydrocarbons such as cyclopentadiene-1,3, cyclohexadiene-1,3, cycloheptadiene-1,3, dimethyl fulvene and others; the aryl-substituted diolefin hydrocarbons such as phenyl-butadiene-1,3, 2,3-diphenyl-butadiene-1,3, diphenyl fulvene and others; and mixtures of any two, three or more of such 1-monoolefins and/or conjugated polyolefins with or without non-conjugated polyolefins such as allene, diallyl, dimethallyl, propyl allene, squalene, 1-vinyl-cyclohexene-3, and others.

The method of this invention is of relatively greater importance in treating reaction mixtures containing soluble polymers which contain unsaturation, that is, the vulcanizable polymers of the open-chain, aliphatic conjugated dienes and particularly those of isoprene and butadiene-1,3. Because the method of this invention completely inactivates, neutralizes and quantitatively extracts the catalyst residue as an aqueous layer (highly immiscible with the solvent polymer solutions), polymer degradation is minimized and a neutralized polymer product obtained which is consistently vulcanizable to have excellent vulcanized properties.

The method of this invention may also be employed to treat polymerization reaction mixtures which have been preliminarily treated with alcohol, amines, de-gassed water, or other catalyst killers. Treatment with an aqueous solution of complexing agent removes the metallic content and dissolves precipitates derived from the organometallic catalysts even though such metallic content is present in an intermediate or insoluble reaction form.

The aqueous complexing solution of this invention will remove the metallic content of any hydrocarbon solvent solution of polymer. Thus, it will remove alkali metals, alkaline earth metals, tin, lead, zinc, and other heavy (polyvalent metals). Thus, in the preferred reaction mixtures made with heavy metal organometallic catalysts containing metals of the 4th to 10th positions of the periodic arrangement of the elements in short and long periods, metals such as titanium, vanadium, zirconium and tantalum are effectively complexed or chelated and removed from solution in the hydrocarbon solvent. The so-called "heavy metal organometallic catalysts" comprise compounds made up of metal atoms connected to hydrocarbon radicals and to salt-forming acid radicals, with at least one of the metal atoms being a heavy metal atom of the 4th to 10th positions, as described above. Such catalysts may also contain, in addition to hydrocarbon and acid groups other groups attached to metal including (1) oxyhydrocarbon radicals such as alkoxy radicals, aroxy radials, etc. and (2) hydrogen atoms. Acid forming groups include organic salt-forming groups such as the acetyl-acetone radicals, the oxalate radical, etc. and inorganic salt-forming radicals such as the halogen atoms (that is, fluorine, chlorine, bromine and iodine) as well as the corresponding oxyhalide radicals, nitrate radicals, sulfate radicals, etc. The term "heavy metal of the 4th to 10th positions, etc." includes the metals of groups IVB, VB, VIB, VIIB and VIII of the Mendeleef style table including specifically titanium, zirconium, halfnium, vanadium, niobium (columbium), tantalum, chromium, molybdenum, tunsten, manganese, technetium, rhenium, iron, cobalt, nickel, ruthenium, rhodium, palladium, osmium, iridium and platinum as well as metals in the corresponding positions in the last long period in the so-called "actinium series" such as thorium and uranium.

The above definition of catalysts which are inactivated and extracted by the method of this invention includes catalysts made by bring a plurality of chemical compounds, one of which may be an organometallic compound in which a carbon atom of an organic group is attached to a metal atom other than a heavy metal atom of the group set forth, for example, an alkali metal (sodium, potassium or lithium) or an alkaline earth metal (such as barium, calcium or strontium) or magnesium, or aluminum, or zinc, or a rare earth metal, or tin, or lead, or some other metal, and another of which may be a simple compound such as a salt of a heavy metal of the group set forth, the two types of metal compounds each having the metal atoms connected only to radicals of the type set forth above. There is also included catalysts formed by reacting the heavy metal in activated form with an olefinic compound (which may be the same as that later polymerized) which provides the organic radical linked by carbon to the heavy metal atom. As examples of the above-mentioned types of catalysts, lithium titanium isobutyl complex is an example of a single compound type catalyst and a reaction product of a trialkyl aluminum or a tetraalkyl tin compound with titanium or vanadium tetrachloride are examples of catalysts made by interacting two compounds.

Much preferred as heavy metal organometallic catalysts are those made by reacting (1) an organometallic "alkyl donor" substance such as an alkyl aluminum compound or an alkyl tin compound with (2) a titanium or vanadium tetrahalide such as titanium tetrachloride or vanadium tetrachloride and others. An optional third ingredient is a metallic "halide donor" such as $AlCl_3$, an alkyl aluminum halide, $BF_3$, $SnCl_4$, and others. Of course, the first and third ingredients named above can be supplied in the form of a single compound such as an alkyl aluminum halide including diethyl aluminum fluoride or bromide, diisobutyl aluminum chloride and many others. Illustrative alkyl aluminum compounds include those mentioned above and in addition, trimethyl aluminum, triethyl aluminum, tripropyl aluminum, tri n-butyl aluminum, triisobutyl aluminum, trioctyl aluminum, diisobutyl aluminum fluoride and many others. Alkyl tin compounds which may be utilized include tetraethyl tin, tetrabutyl tin and others. The combination of a trialkyl aluminum compound and either titanium or vanadium tetrachloride is preferred.

The above and other heavy metal organometallic catalysts are so extremely sensitive to oxygen (in fact, some of them are pyrophoric) that the catalyst must be prepared in an inert atmosphere, the polymerization carried out under such an atmosphere, and the polymerization reaction mixture protected by such an atmosphere at least until the catalyst and its residues have been converted to oxygen-insensitive products. Thus, the reaction mixtures, under an inert atmosphere such as nitrogen, argon, helium or hydrocarbon vapors, is treated with the aqueous solution of metal complexing agent before being exposed to oxygen of the atmosphere. This is most easily accomplished in a closed vessel filled with the inert gas or vapor and fitted with an agitator. Reaction between the water and/or complexing agent, on the one hand, and the catalyst on the other is rapid, although the reaction time will depend on viscosity and efficiency of agitation. Following the addition of the complexing solution monovalent alkali such as sodium, potassium, lithium or ammonium hydroxides, or the corresponding water soluble alkaline salts such as the bicarbonates, phosphates, etc. are added in sufficient quantity to raise the pH of the aqueous phase to a value of at least 5 and preferably to at least 7. Polymer isolated from such mixtures will be neutral or nearly so. Usually it is preferable to neutralize to a pH of between 7 to 9 to insure efficient removal of acidic cations. Upon neutralization the acidic material is converted to water-soluble salts which are of low solubility in the hydrocarbon solvent. As a result they are substantially quantitatively extracted by the water phase.

The aqueous complexing solution may contain any complexing or chelating agent which (1) forms a water-soluble complex or chelate with the particular heavy metal involved and (2) which complex or chelate is stable under neutral or alkaline conditions. The terms "complex" and "chelate" are roughly equivalent, within the meaning of this invention. The art is uncertain whether certain "complexes" are in reality true "chelates" or vice versa. Of course, there are certain stable metal-containing complexes wherein the metal is not known to be bound by coordinate valences such as in true chelates. In chelate chemistry one of the most widely accepted evidences of the presence of the chelate structure in a given complex is the latter's resistance to decomposition by common reagents such as acids, alkali, etc.

The complexing or chelating agent must contain not only the functional groups which complex or chelate but also at least one other grouping which contributes solubility in water to the heavy metal complex or chelate. For example, salicylic acid is a well-known chelating agent which is soluble to a certain extent in water yet which usually forms water-insoluble heavy metal chelates because the alpha-hydroxyl/carboxyl groupings (alpha-hydroxyl/carboxyl coordinating groupings) are tied up by the chelate ring and the chelate then has insufficient hydrophilic nature to remain soluble in water. Sulfosalicylic acid, however, forms corresponding chelates which are soluble in water. Thus additional hydrophilic groupings not entering into the chelate ring structure and which impart water-solubility include sulfonic acid groups as described above; excess carboxyl groups such as, for example, in tartaric acid, citric acid, etc.; excess hydroxyl groups such as those not "alpha" to a carboxyl; carboxyl-salt linkages such as in the salt forms of ethylenediaminetetraacetic acid; phosphate and salt-phosphate groups; amino groups; ketone groups; and many others.

Illustrative complexing or chelating agents include carboxylic acids such as tartaric acid, citric acid, maleic acid, trihydroxy-glutaric acid, mucic acid, glyceric acid, gluconic acid, glycine, tricarballylic acid, glutamic acid, aspartic acid, alanine, and many others; amino acids of the polycarboxylic acid amine type such as 2-sulfoanilinediacetic acid, ethylenediaminediacetic acid, ethylenediaminetetraacetic acid, ethylenediaminetetrapropionic acid and many others; aldehydes such as sulfosalicylaldehyde and others; beta-diketones such as acetylacetone, ethyl acetoacetate and others; condensed phosphates such as tetrametaphosphoric acid, trimetaphosphoric acid, and their partial salts, and others; the o-hydroxyphenones such as o-hydroxypropiophenone; and many, many others.

Of the above and other known complexing and chelating agents, the preferred type comprises a water-soluble chelating agent selected from the class consisting of the water-soluble alpha-hydroxy polycarboxylic acids such as tartaric acid, malic acid, citric acid, sulfosalicylic acid, and the like and the "un-natural" types of amino carboxylic acids such as ethylenediaminetetraacetic acid. These agents form heavy metal chelates of exceptional stability under both acid and alkaline conditions.

The treatment with the complexing agent should be carried out under acidic conditions because precipitates tend to form under alkaline conditions. Thus the hydrocarbon solution preferably is treated in the order: (1) first with the solution of complexing agent and (2) second with alkali. When this order is followed no precipitates will be encountered.

The amount of complexing agent employed should at least be equivalent to the amount of heavy metal present in the solvent. This means that the proper molar ratio of complexing agent to heavy metal should be employed, depending, of course on the combining ratios of the two materials. It is better to utilize an excess of the complexing agent to insure complete extraction and maintain the pH on the acid side until the alkali can be added. Of course, it is also preferred to have sufficient water present to form an aqueous phase in sufficient quantity to dissolve and carry away, as an easily-separable aqueous phase, all of the heavy metal complex.

The invention will now be described with reference to several specific examples which are intended as being illustrative only.

Example I

In this example a benzene solution containing an active catalyst is treated by the method of this invention. The catalyst is made by adding 440 grams of dry, thiophene-free benzene (Ca. 500 ml.) to a nitrogen-filled glass bottle equipped with a good seal. About 1 ml. of tri-isobutyl aluminum is then added followed by 0.38 ml. of titanium tetrachloride with occasional swirling of the contents of the bottle. The solution soon turns a coffee brown color and a dark colored precipitate is observed to settle out at the bottom of the bottle. A small portion of this solution is withdrawn from the nitrogen-filled bottle through a tubing into a small sample bottle filled with nitrogen and fitted with a ground glass stopper. A volume of a saturated aqueous solution of tartaric acid sufficient to furnish 3 to 4 times the molar equivalent of the weight of metal (as oxides) in the catalyst solution is added to the bottle, the bottle recapped and then shaken vigorously. The brown color of the benzene layer rapidly disappears and the brown precipitate goes into solution. When allowed to stand for a moment the contents of the bottle separate into an upper layer of water-white benzene and a lower layer of an almost clear water layer that seems to have a slightly greenish cast. Concentrated ammonia is then added to a pH of 7. No precipitate can be observed in either layer. Additional $NH_4OH$ is then added to raise the pH to 12. When the two layers are allowed to separate and then are separately exposed to air no precipitate forms in either layer. The benzene layer is separated and then washed several times with distilled water. When the benzene layer is evaporated to dryness no residue can be detected.

Example II

The above procedure is repeated using a full charge of the catalyst prepared as in Example I. To this solution (ca. 500 ml.) there are added a solution of 100 ml. of water and 1.38 grams of tartaric acid, while carefully preserving a nitrogen atmosphere. When allowed to stand a lower aqueous layer separates having a bright green color and exhibiting a slight turbidity. A small aliquot of the aqueous layer is withdrawn and treated with a great excess of tartaric acid. The turbidity then disappears. The aliquot is then made alkaline with concentrated $NH_4OH$. No precipitate can be observed.

The remainder of the aqueous layer is treated with 1 ml. of concentrated (28%) $NH_4OH$ and the turbidity disappears. Its color is then a dark green. An additional 3 ml. of $NH_4OH$ is added and the color turns a dark blue, the solution being clear and free of turbidity or precipitate. Evidently either an excess of tartaric acid or neutralization with ammonia is required to clear up turbidity. The use of ammonia is more economical.

Example III

In this example, a catalyst charge similar to that of Example I is employed. A solution of tartaric acid is prepared by mixing 40 ml. of methanol and 120 ml. of benzene with a considerable excess of tartaric acid. After standing for some time 4.06 grams of the acid is found to have dissolved. An 80 ml. portion of the tartaric acid solution (containing about 2 grams of tartaric acid) is injected into the 500 ml. of active catalyst solution. After mixing for awhile anhydrous ammonia is bubbled into the solution, whereupon a precipitate begins to settle out. After an additional 150 ml. of methanol is added the precipitate still persists. When, however, about 180 ml. of water is added all of the precipitate dissolves and the benzene layer is decolorized. Obviously an aqueous phase is required to neutralize and extract the catalyst without precipitation.

Example IV

A charge of active catalyst similar to that of Example I is treated with a solution of 1 gram of ammonium tartrate dissolved in 180 ml. of water. The benzene layer becomes clear and colorless. The water layer, however, appears to be a soupy green color and has a pH of 2 or less. Anhydrous $NH_3$ is bubbled into the water layer and it immediately clarifies and turns a dark blue color. Air is then bubbled through the aqueous layer and the color changes to a clear light green color. No precipitate is observed in either layer.

Example V

Still another charge of active catalyst similar to that of Example I is treated with anhydrous $NH_3$ gas. A cloudy, brownish, colloidal solid forms in the benzene solution. A solution of 1 gram of ammonium tartrate in 100 ml. of water is then added. A black colored precipitate forms in the water phase and the benzene layer is clear and colorless. In an attempt to clarify the aqueous layer 2 grams of tartaric acid dissolved in 200 ml. of water are added. A dark colored colloidal solution results. The same results are obtained when tartaric acid is substituted for the ammonium tartrate employed above.

From the results obtained in Examples III, IV and V it appears that the tartaric acid complex or chelate of titanium and aluminum has to be formed in the presence of water and on the acid side to prevent formation of a precipitate.

Example VI

In this example a catalyst solution such as is described in Example I is employed to polymerize isoprene. About 40 grams of dry, freshly distilled isoprene free of 2-butene, cyclopentadiene and alpha-acetylenes are added to the fresh catalyst solution after the latter has aged for about 15 minutes at room temperature. Reaction is carried out in a water bath at 5° C. by tumbling the bottle end over end. After about 4 to 6 hours the bottle contains a dark brown cement-like solution containing between about 6 and about 8 percent by weight of an all cis-1,4 polyisoprene. The bottle is then removed from the water bath and its contents drained through a tubing into a nitrogen-filled flask. The flask and its contents are then warmed to about 50° C. and a solution containing about 1.4 grams of tartaric acid in 100 ml. of water is added thereto. Mixing is continued for about 20 minutes and the mixture is then made alkaline (pH 9) by the addition of concentrated $NH_4OH$. After a few minutes mixing the stirrer is shut off and the layers allowed to separate. The upper benzene/cement layer is clear and colorless. The lower aqueous layer is clear and is of a dark blue color.

The aqueous phase is then drawn off and discarded. The clear, colorless benzene cement is then washed twice with fresh distilled water. Finally, the cement is poured into an open flask and methanol is added thereto while applying heat. When the temperature of the solution reaches about 57° C. distillation commences, the distillate (60% benzene/40% methanol) being taken off through a water cooled condenser. After a considerable quantity of methanol has been added a crumb starts to form. Distillation and addition of methanol is continued until a neutral slurry of polymer in essentially pure methanol is obtained. The latter is screened and the polymer is passed through a heated extruder to drive off absorbed methanol. A dry, benzene-and alcohol-free polymer is obtained that is very low in ash content (i.e. below about 0.1 percent). The polymer is neutral and does not corrode milling, extruding, calendering and molding equipment. The polymer vulcanizes with sulfur to produce pure gum and heavy tread stocks of excellent properties.

Example VII

The procedure of Example VI is repeated employing ethylenediamine tetraacetic acid instead of tartaric acid. The results are substantially the same, the final polymer product being substantially neutral and very low in inorganic ash content.

Example VIII

In this example, ethylene is polymerized in benzene containing a catalyst similar to that of Example VII. The product is a dark-colored slurry of solid polyethylene in benzene. The resulting slurry is treated first with about 40 ml. of methanol and then with an aqueous solution of 1.4 grams of tartaric acid dissolved in about 100 ml. of distilled water. The methanol is added to assist the water in wetting the polyethylene. The slurry is decolorized after a few minutes mixing. The slurry is then made neutral with aqueous $NH_4OH$ and the mixture agitated for several minutes more. The water layer is withdrawn and the benzene slurry layer washed several times with equal volumes of distilled water. Finally the slurry is filtered and the filter cake dried in a vacuum oven. A snow white polyethylene is thus obtained.

Example IX

A slurry of polyethylene in benzene similar to that of the preceding example is treated with 100 ml. of methanol and then with an equal volume of an aqueous solution containing 2 to 3 grams of citric acid. After the mixture had been agitated for several minutes sufficient ammonia gas is bubbled through the mixture to raise the pH to about 7. The water layer is separated and discarded. The benzene slurry is then filtered and the filter cake reslurried several times in distilled water and dried. A snow white granular polyethylene is obtained.

Example X

The procedure of Example VI is repeated using as a catalyst the reaction product of triisobutyl aluminum and vanadium tetrachloride. The catalyst is made by reacting from about 5.82 to 16 millimoles per liter of $VCl_4$ with from 48 to 80 millimoles of triisobutyl aluminum. The solvent is heptane, the monomer is isoprene, and the polymerization is conducted under nitrogen at 30° C. In about 69 hours there is obtained in each case a conversion of about 100 percent of the isoprene to an essentially all trans-1,4 polyisoprene. The products are completely soluble, forming quite viscous brown solutions.

To about 500 ml. of each of the above-described solutions (under nitrogen) there are added 300 ml. of distilled water containing about 6 grams of tartaric acid. The resulting mixture is agitated for a few minutes and then anhydrous ammonia gas is bubbled through the mixture. When allowed to stand, separate layers are formed. The upper heptane layer is clear and colorless. The lower layer is likewise clear and free of precipitate. The aqueous layer is withdrawn and discarded. Later, the heptane layer is washed with fresh distilled water, the solution coagulated with ethanol and the solid polymer dried. The dry polymer in some cases is leathery in nature and resembles balata in many respects. All the polymers have low ash contents.

We claim:

1. The method of treating a catalyst-contaminated reaction mixture made by polymerizing a 1-olefinic hydrocarbon in a hydrocarbon solvent containing a catalyst made by combining (1) an organometallic alkyl donor selected from the class consisting of alkyl aluminum and alkyl tin compounds with (2) a heavy metal compound selected from the class consisting of titanium and vanadium tetrahalides, which method comprises the steps, in the following order, (A) mixing said reaction mixture, while excluding oxygen by maintaining thereover, an inert atmosphere selected from the class consisting of nitrogen, argon, helium and hydrocarbon vapors, with an aqueous solution containing an excess of an agent selected from the class consisting of tartaric acid, citric acid, and ethylene diamine tetra-acetic acid, said mixing being effected while said reaction mixture and the said aqueous solution are acidic, (B) after reaction has occurred between said catalyst contamination and said agent, adding a monovalent alkali to raise the pH of the resulting multi-phase mixture to at least 5, said inert atmosphere being maintained until after the addition of said alkali, and (C) separating an aqueous phase from the said multi-phase mixture thereby to remove said catalyst contamination in said aqueous phase.

2. The method of treating a catalyst-contaminated reaction mixture made by polymerizing an open-chain, aliphatic conjugated diene in a hydrocarbon solvent containing a catalyst prepared by combining in said solvent (1) a trialkyl aluminum compound with (2) a heavy metal compound selected from the class consisting of titanium and vanadium tetrahalides, which method comprises the steps, in the following order, of (A) mixing said reaction mixture, while excluding oxygen by maintaining thereover an inert nitrogen atmosphere, with an aqueous solution containing an excess of an agent selected from the class consisting of tartaric acid, citric acid, and ethylene diamine tetraacetic acid, said mixing being effected while both said reaction mixture and said aqueous solution are acidic, (B) after reaction between said catalyst contamination and said agent has occurred, adding a monovalent alkali to raise the pH of the resulting multi-phase mixture to a pH of about 7 to 9, said inert nitrogen atmosphere being maintained until after the addition of said alkali, (C) separating an alkaline aqueous phase from the said multi-phase mixture, and (D) separating a neutralized diene polymer low in catalyst contamination from said solvent.

3. The method of treating a catalyst-contaminated solution of polymer made by polymerizing an open-chain, aliphatic conjugated diene in a hydrocarbon solvent containing a catalyst made by combining (1) a trialkyl aluminum with (2) a titanium tetrahalide, which method comprises the steps, in the following order, of (A) mixing said polymer solution with an aqueous solution containing an excess of tartaric acid while excluding oxygen by maintaining over the resulting multi-phase mixture an inert nitrogen atmosphere and acidic conditions therein, (B) after reaction between said catalyst contamination and said tartaric acid has occurred, adding a monovalent alkali thereto to a pH of about 7 to 9, meanwhile maintaining said inert nitrogen atmosphere until after the addition of said alkali, (C) separating an alkaline aqueous tartaric acid solution containing said catalyst contamination from said multi-phase mixture, and (D) separating a neutralized diene polymer low in catalyst contamination from said solvent.

4. The method as defined in claim 2 wherein said diene is isoprene and said heavy metal compound is vanadium tetrachloride.

5. The method as defined in claim 3 wherein the said diene is isoprene.

References Cited in the file of this patent

UNITED STATES PATENTS

| | | |
|---|---|---|
| 2,440,498 | Young et al. | Apr. 27, 1948 |
| 2,544,649 | Bersworth | Mar. 13, 1951 |
| 2,667,522 | McElroy | Jan. 26, 1954 |
| 2,699,457 | Ziegler et al. | Jan. 11, 1955 |